United States Patent [19]
Hall, Jr.

[11] 3,760,838
[45] Sept. 25, 1973

[54] HOSE STORAGE SYSTEM FOR A WASHING APPLIANCE

[75] Inventor: Edwin M. Hall, Jr., Louisville, Ky.

[73] Assignee: General Electric Company, Louisville, Ky.

[22] Filed: Oct. 6, 1972

[21] Appl. No.: 295,437

[52] U.S. Cl. ........ 137/355.17, 134/186, 137/355.23, 137/355.28
[51] Int. Cl. ............................................. B65h 75/36
[58] Field of Search ............... 15/315, 323; 68/3 R; 134/186; 137/343, 355.16, 355.17, 355.18, 355.19, 355.2, 355.21, 355.22, 355.23, 355.24, 355.25, 355.26, 355.27, 355.28, 234.6; 222/74, 75

[56] References Cited
UNITED STATES PATENTS

| | | |
|---|---|---|
| 2,737,192 | 3/1956 | Bieler .................... 137/355.26 X |
| 3,456,680 | 7/1969 | Martiniak ..................... 137/355.17 |
| 3,461,906 | 8/1969 | Eckerle ......................... 137/355.17 |

*Primary Examiner*—Alan Cohan
*Assistant Examiner*—Gerald A. Michalsky
*Attorney*—George C. Atwell

[57] ABSTRACT

An improved storage system for manually extendable and retractable hoses, such as the water inlet hose and the effluent discharge hose, of a portable washing appliance. The hoses are stored in separate intersecting compartments arranged between the appliance cabinet and the washing chamber. The arrangement of separate compartments substantially separates the hoses whereby manipulation by the appliance operator requires a minimum of effort, and the life of the hoses is substantially improved due to reduced wear from frictional engagement.

5 Claims, 2 Drawing Figures

PATENTED SEP 25 1973 3,760,838

HOSE STORAGE SYSTEM FOR A WASHING APPLIANCE

BACKGROUND OF THE INVENTION

This invention relates generally to an improved hose storage system and more particularly to a storage system wherein manually extendable and retractable hoses are stored in separate compartments within a portable washing machine cabinet.

Prior to the present invention the water inlet hose and the effluent discharge hose in many portable washing appliances, such as a dishwasher, have been stored together in a common compartment in the cabinet. The withdrawal of the hoses from the storage compartment would normally not appear to be difficult since it only involves overcoming the weight of the hoses, however, added to this is the frictional engagement between the hoses and frictional contact with the adjacent walls of the compartment. Reinserting the hoses into the compartment is more difficult than withdrawal. During withdrawal, tension is placed on the hoses, however, during insertion the hoses are placed in compression and, in effect, stuffed into the compartment. This action, together with the friction between the inlet and effluent discharge hoses, often requires excessive effort by the user of the machine. This is especially true after continued use at a particular location where the hoses are generally withdrawn the same distance during each use of the machine and, as a result, the rubber hoses acquire a "set" at an intermediate point along the length thereof. This is acquired "set" and the fact that these hoses, one of which is generally heavy duty with a substantially thick side wall to withstand water pressure, makes the hose assembly quite cumbersome for the housewife to manipulate.

Examples of the prior art of hose storage systems are disclosed in U.S. Pat. No. 3,456,680 issued to L. J. Martiniak and U.S. Pat. No. 3,461,906 issued to W. A. Eckerle, both of which are assigned to the General Electric Company, the assignee of the present invention. It will be noted in these arrangements that although the hoses are conveniently stored in the compartment provided between the cabinet and the washing tub, the hoses are withdrawn and inserted into the compartment while being held substantially in parallel relationship such that the user must not only deform the hoses to effect withdrawal and retraction but must also overcome the frictional engagement between the hoses as they move relative to each other in different arcuate configurations in the compartment.

SUMMARY OF THE INVENTION

Briefly stated, in accordance with one aspect of the present invention, there is provided a hose storage system for a washing appliance wherein at least two intersecting hose storage compartments are provided between the cabinet and the washing chamber on the machine. A water inlet hose and an effluent discharge hose are respectively arranged for storage in a separate one of the compartments. Each hose has a portion thereof secured against movement relative to its respective compartment. Each of the hoses has a portion extending from its secured end to a terminal or outer end which is free to move relative to its compartment. The outer or terminal ends of the hoses are preferably united at a connector that serves as a means for pulling the hoses out through a common exit opening in the cabinet. The storage compartments merge at a point rearwardly adjacent the common exit opening.

In the preferred embodiment of the invention, the level of the hose exit opening is substantially above at least one of the storage compartments whereby, during insertion of the hoses by the operator, the weight of the hose dropping into the lower level compartment serves to pull the other hose into the other compartment.

DESCRIPTION OF THE PREFERRED EMBODIMENT

Figure 1:
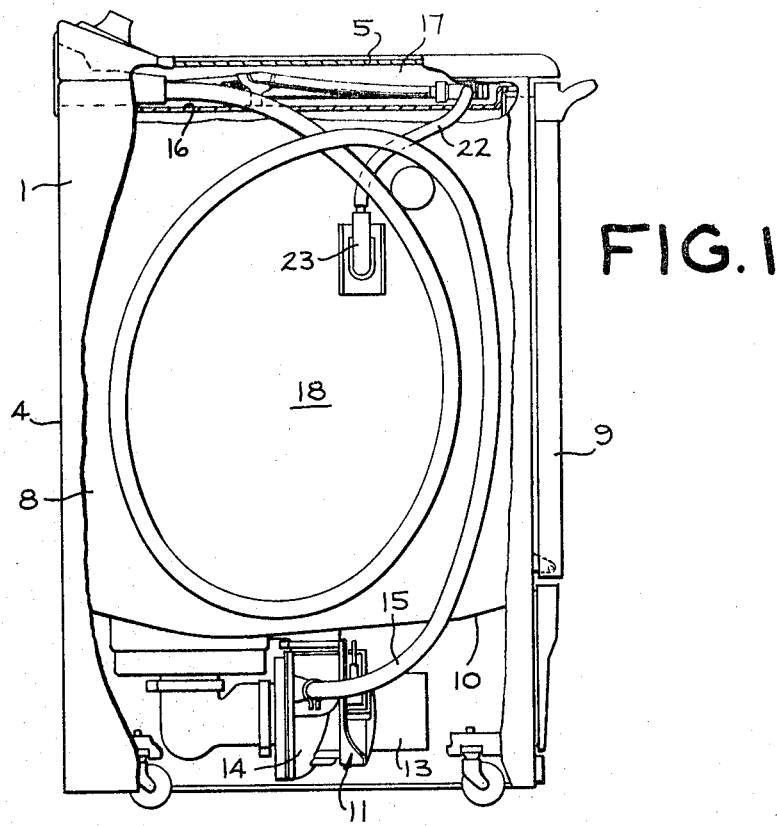
FIG. 1 is a side elevational view of a portable dishwasher, in accordance with the present invention, with the outer cabinet wall cut away to illustrate the disposition of the effluent discharge hose.

Referring to the drawing, there is illustrated a portable dishwasher including an outer cabinet 1 having side walls 2 and 3, a rear wall 4 and a top wall 5. Within cabinet 1 is a generally rectangular tub 8 which defines a wash chamber (not shown). The tub 8 and outer cabinet 1 are constructed to have a front opening to which a door 9 is hinged. The lower extremity of the wash chamber is defined by a bottom wall 10 on which is supported a motor pump assembly 11 which includes an electric motor 13 and pump 14. The pump 14 is provided with an effluent discharge outlet communicating with a conduit or effluent discharge hose 15 which is secured to the housing of the pump.

Figure 2:
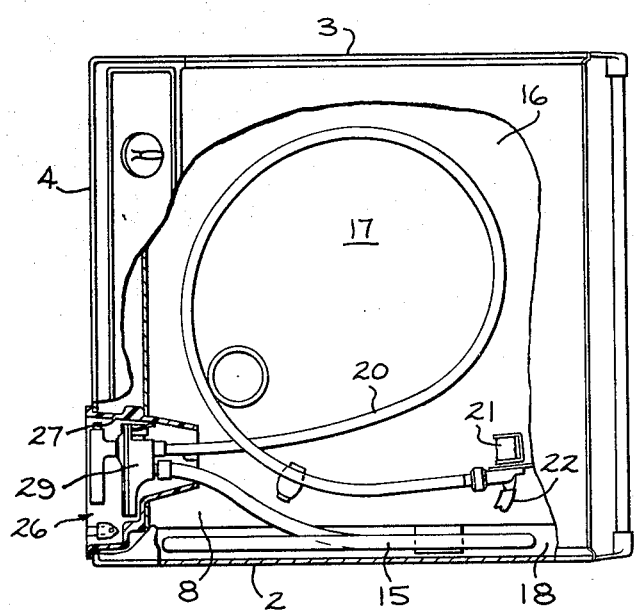
FIG. 2 is a top view of the dishwasher of FIG. 1, partially cut away to show the disposition of the inlet hose thereof.

The upper extremity of the tub 8 is defined by a wall 16 which also serves to define the lower extremity of a hose storage compartment or first compartment 17. The upper extremity of the compartment 17 is defined by the wall 5 which also serves as the upper appearance surface of outer cabinet 1 and may be used as a work surface by the housewife. Located between a side wall of the tub 8 and the side wall 2 of the cabinet is a second hose storage compartment 18. Compartment 17 is adapted to receive and store a water inlet or first hose 20, while the compartment 18 is adapted to receive and store an effluent discharge hose or second hose 15. Hose 15 extends upwardly from its connection with the pump 14, between the cabinet and tub wall, and into compartment 18. As illustrated in FIG. 2, the water inlet hose 20 communicates with a water inlet valve 21. The valve 21 is disposed within the compartment 17 and has connected thereto a conduit 22 which extends downwardly (FIG. 1) between the outer cabinet wall 2 and tub 8 into compartment 18 to terminate at a fill funnel 23 which communicates directly with the wash chamber of tub 8.

The cabinet rear wall 4 is provided with a hose exit opening 26 therein through which the hoses 15 and 20 may be at least partially temporarily withdrawn to extend outwardly from the cabinet during use of the dishwasher. A member 27 may be provided in the opening 26 to serve as a conformably-shaped pocket for a connector 29 and as a guide for the hoses 15 and 20 as they are slid therethrough, inwardly or outwardly, with respect to the compartments 18 and 17.

The connector 29 is of the type disclosed in U.S. Pat. No. 3,306,319, which is assigned to General Electric Company, the assignee of the present invention, and it serves to connect the water inlet hose 20 in communication with a conventional kitchen faucet. The connector 29 serves also to position the open end of the effluent discharge hose 15 over the sink so that drainage liquids discharged therethrough will be directed into the sink below the faucet.

In accordance with the present invention, a portion of each of the hoses 15 and 20 is secured against movement relative to its respective compartments 18 or 17; the hose 20 by its attachment to the valve 21, and the hose 15 by its attachment to the pump housing 14. The remaining or major portions of the hoses 15 and 20 are free to be manually moved relative to their respective compartments 18 and 17. The normal position of the effluent hose 15 within the compartment 18, as illustrated in FIG. 1, is one of a large loop consuming most of the compartment 18, while the normal position of the inlet hose 20 within compartment 17, as illustrated in FIG. 2, is one of a large loop consuming most of the compartment 17.

As can be readily understood in accordance with the illustrated embodiment of the present invention, the routing of the hose 20 into the chamber 17 in the upper cabinet while routing the other hose 15 into the chamber 18 in the side wall of the cabinet permits the hoses, as they are withdrawn from or inserted into their respective compartments, to be spaced or isolated from each other, so that they do not rub against each other. Accordingly, the withdrawal and insertion of the hoses 15 and 20 is facilitated by their separation since the housewife does not have to contend with frictional contact between the hoses as they are moved during the normal use of the appliance. In other words, the user does not have to contend with resistance to movement between the hoses as well as the resistance of each hose occasioned by its contact with the cabinet or tub side wall, etc.

Hoses manufactured for the purpose heretofore described are designed to be elastically flexible and normally seek to maintain a linear orientation except when purposefully deformed to another shape. Thus, when the hoses 15 and 20 are manually withdrawn to extend outwardly from the cabinet for attachment by means of the connector 29 to a sink faucet, the hoses tend to remain straight except for a slight drape due to their own weight. When the hoses are manually re-inserted through the cabinet opening 26, each hose has the tendency to begin a small loop that unwinds to a large loop within its compartment. The tendency of the hoses to unwind and occupy the available space within the compartment serves to pull the remaining ends of the hoses, where the connector 29 joins the hose ends, into stored position within the opening 26. Further, the weight of the hose 15 dropping into its compartment 18 exerts a pulling force which is translated therethrough to the connector 29 whereby the hose 20 is more readily urged into its compartment 17. The aforementioned characteristics serve to impart to the hoses, as they are being inserted by the machine operator, an action that one would normally expect to encounter only upon use of a spring or other biasing means in combination with the hoses to urge them inwardly. Thus, the particular disposition of the hose storage compartments herein disclosed and the specific independent storage location for each of the hoses provided therebY, gives a retraction or re-insertion assistance feature that could only otherwise be accomplished in a more expensive and complicated system.

With the present invention, a "self-seating" effect occurs wherein the connector 29 snaps into its stored position within the opening 26 upon re-insertion of the hoses 15 and 20, and a problem familiar to many more conventional hose storage systems in appliance cabinets of the prior art is thereby solved. More specifically, where the housewife found great difficulty in urging hoses into their storage position within an appliance cabinet available heretofore, she would often abandon her efforts to re-insert the hoses entirely and permit the hose ends to dangle outwardly several inches from the cabinet. Utilization of the present invention obviates this possibility since, once the major hose portions have been manually re-inserted, the outer portion of the hoses and the connector therewith appear to the housewife to travel inwardly of their own volition and seat in the proper stored position. The hoses in the system herein disclosed are assured a comparatively longer life due to the relatively less frictional engagement between them and the inherent tendency of the hoses to yield easily to the minimal manual withdrawing and retracting force applied thereto.

While in accordance with the Patent Statutes, I have described what at present is considered to be the preferred embodiment of my invention, it will be apparent to those skilled in the art that various changes and modifications may be made therein without departing from the scope and spirit of the invention as set forth in the claims appended hereto.

I claim:

1. A hose storage system in a portable washing appliance of the type having a cabinet and a wash chamber therein, comprising:

a first hose;

a second hose;

a first hose storage compartment for the first hose;

a second hose storage compartment for the second hose;

the compartments being within the cabinet and outside of the chamber, and being disposed to intersect with each other;

a hose exit opening through the cabinet side wall and adjacent the intersection of the compartments;

the hoses adapted to be at least partially manually inserted into and partially withdrawable from the compartments and through the exit opening;

means disposed adjacent the opening, when the hoses are stored substantially within their respective compartments, joining ends of the hoses to one another whereby the hoses and insertable and withdrawable in unison through the opening.

2. The hose storage system of claim 1 wherein the first hose storage compartment is disposed substantially below the level of the exit opening whereby, upon manual insertion of the hoses, the weight of the first hose dropping into the first storage compartment serves to pull the second hose inwardly to the second compartment.

3. A hose storage system for a washing machine including a cabinet and a washing chamber arranged to be spaced from said cabinet comprising:

at least two intersecting hose storage compartments arranged between said cabinet and said washing chamber;

an opening in said machine cabinet communicating with said compartments adjacent said intersection;

a first hose being at least partially withdrawable from one of said compartments;

a second hose being at least partially withdrawable from the other compartment;

means to secure a portion of each of said hoses against movement relative to their respective compartments;

said first and second hoses each having a major portion extending from said securing means to a terminal end which is free to move relative to its respective compartment;

said major portions of said first and second hoses forming a loop within their respective compartments; and the terminal ends of said hoses being brought together at the intersection of said compartments and said opening whereby said hoses may be at least partially withdrawn from their respective compartments through said opening.

4. The hose storage system of claim 3, wherein at least one of said hose storage compartments is vertically disposed between the side walls of said cabinet and said wash chamber.

5. The hose storage system of claim 4 wherein the other of said hose storage compartments is horizontally disposed between the top walls of said washing chamber and said cabinet.

* * * * *